(12) United States Patent
Okamoto et al.

(10) Patent No.: US 6,828,704 B2
(45) Date of Patent: Dec. 7, 2004

(54) ELECTRIC MOTOR

(75) Inventors: Takashi Okamoto, Yamanashi (JP); Tsuyoshi Furuya, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/443,099

(22) Filed: May 22, 2003

(65) Prior Publication Data

US 2004/0012276 A1 Jan. 22, 2004

(30) Foreign Application Priority Data

Jul. 22, 2002 (JP) ........................................ 2002-212631

(51) Int. Cl.$^7$ .............................................. H02K 5/22
(52) U.S. Cl. .............................. 310/71; 310/89; 174/50; 174/52.1; 220/3.7
(58) Field of Search ................ 220/3.2, 3.7; 285/154.1; 310/71, 89; 174/50, 52.1, 61, 63, 65 R

(56) References Cited

U.S. PATENT DOCUMENTS

| | | | | | |
|---|---|---|---|---|---|
| 1,531,152 | A | * | 3/1925 | Steen ........................... | 220/3.8 |
| 1,607,436 | A | * | 11/1926 | Chandeysson ............ | 285/149.1 |
| 4,104,551 | A | * | 8/1978 | Blank et al. ................... | 310/88 |
| 5,192,888 | A | * | 3/1993 | Fleer ............................ | 310/71 |
| 5,223,671 | A | * | 6/1993 | Alfieri ......................... | 174/50 |
| 6,232,553 | B1 | * | 5/2001 | Regen ......................... | 174/64 |

FOREIGN PATENT DOCUMENTS

| | | | | | |
|---|---|---|---|---|---|
| DE | 4342761 | * | 6/1995 | ............ | H02K/5/22 |
| EP | 190602 | * | 8/1986 | ............ | H02K/5/22 |
| EP | 551195 | * | 7/1993 | ............ | H02K/5/22 |
| EP | 1235328 | * | 8/2002 | ............ | H02K/5/22 |
| JP | 5-103440 | * | 4/1993 | ............ | H02K/5/22 |
| JP | 10-2443 | * | 1/1998 | ............ | H02K/5/22 |
| JP | 10-117457 | * | 5/1998 | ............ | H02K/5/22 |
| JP | 10-117458 | * | 5/1998 | ............ | H02K/5/22 |
| JP | 11-004557 | * | 1/1999 | ............ | H02K/5/22 |

* cited by examiner

Primary Examiner—Burton Mullins
(74) Attorney, Agent, or Firm—Staas & Halsey LLP

(57) ABSTRACT

An electric motor capable of securing sufficient degree of freedom in selecting a direction of approaching and connecting electric cables to internal cables of the electric motor. A cable introducing member is in the form of a hollow rectangular prism having four side walls and a through hole formed on one of the side walls. The cable introducing member is detachably mounted on a base member fixed on a body of the electric motor by screws to have one of four orientations angularly displaced by 90° so that the through hole is positioned in conformity with the approach direction of the electric cables. The position of the through hole can be changed by detaching the cable introducing member from the base member and remounting the member to have a different orientation. A terminal rest is provided on the base for connection of the electric cables with the internal cables. The terminal rest has upper terminals to which the electric cables are connected and lower terminals to which the internal cables are connected. The terminal rest may receive the electric cables from two opposite directions in conformity with the position of the through hole. The cable introducing member may have a octagonal cross section or an annular cross section to further increase degree of freedom of orientations of the cable introducing member.

5 Claims, 13 Drawing Sheets

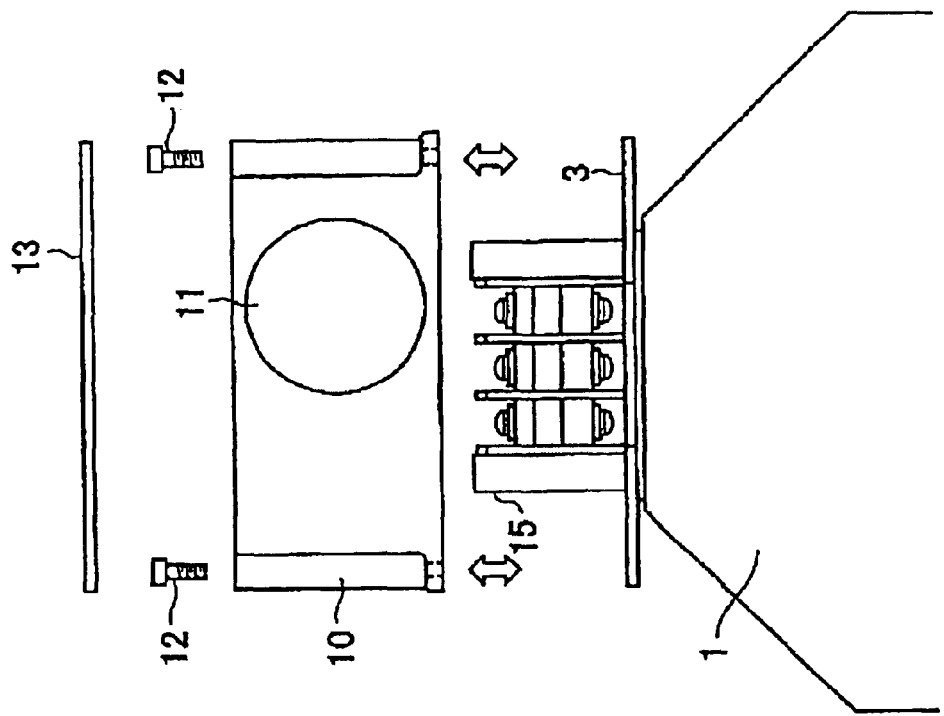
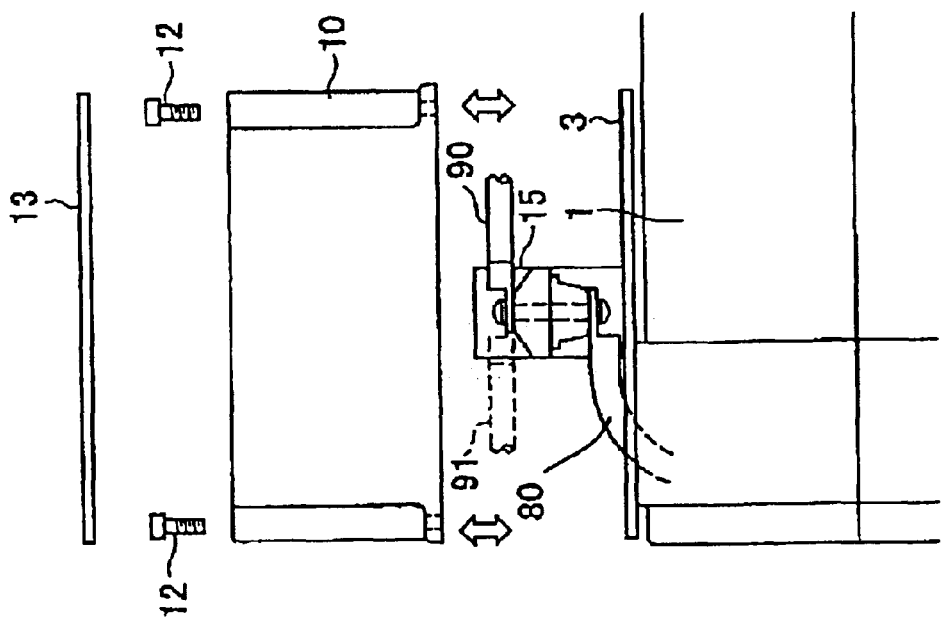

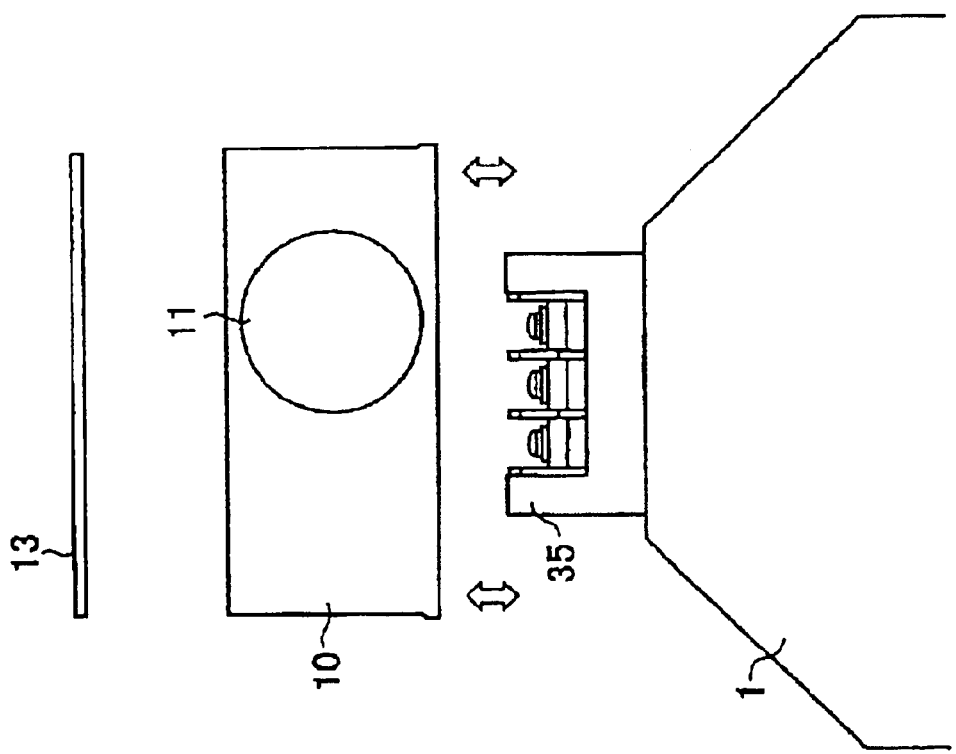
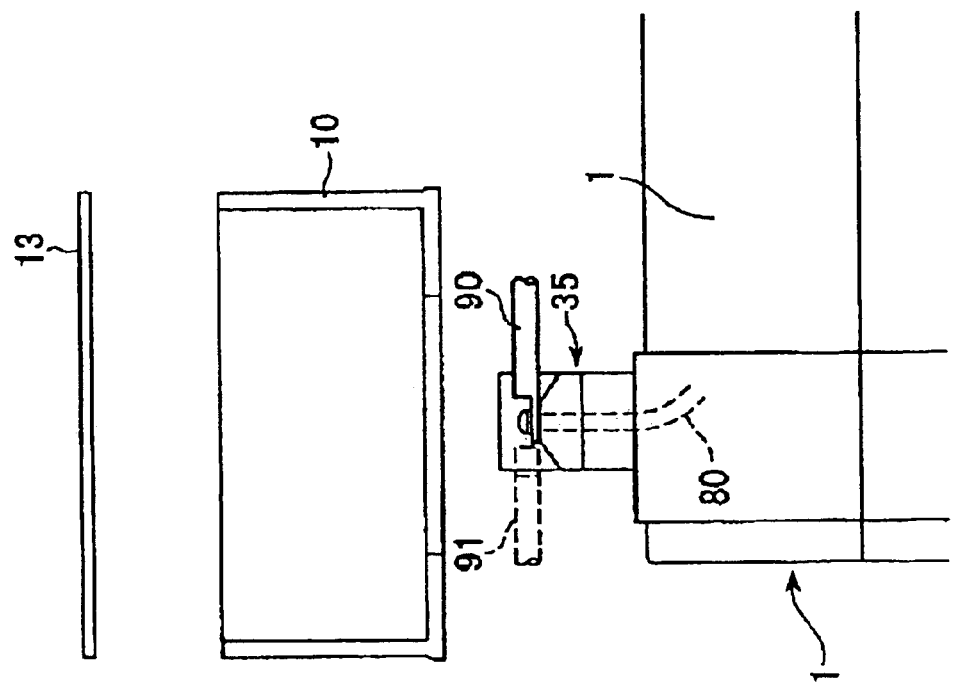

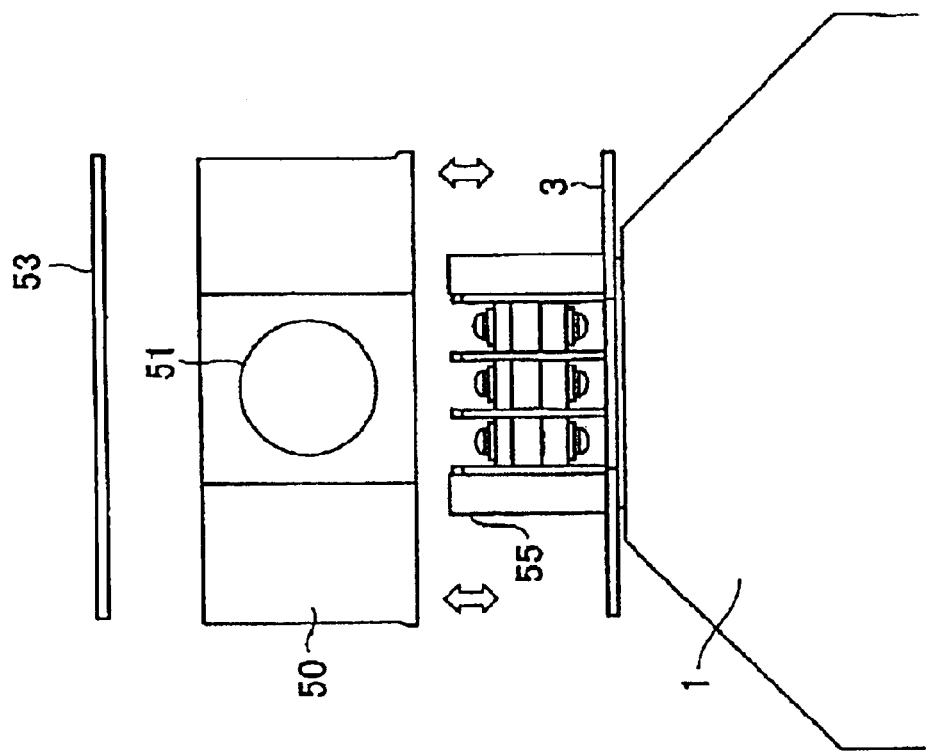
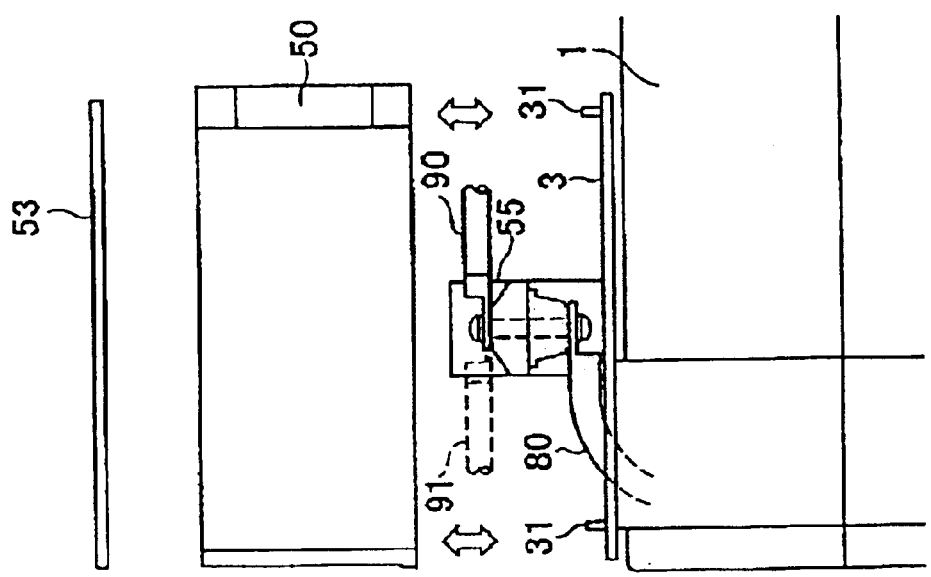

ELECTRIC MOTOR

BACKGROUND OF THE INVENTION

1. Field of the Invention

The present invention relates to an electric motor, and in particular to an improvement of structure for connecting electric cables with internal cables of the electric motor.

2. Description of Related Art

As well known in the art, electric cables such as power cables are connected to terminals of internal cables of an electric motor for supplying electricity to the motor and other purposes. In approaching and connecting the electric cables to the terminals of the internal cables, a high degree of freedom in selecting a direction of the approach and connection of the electric cables has been required by factors such as a design of the motor, a direction of installation of the motor and a relative position of the motor with respect to a plug socket.

The electric cables for power supply are difficult to be handled in a wiring work since they are generally thick and hard. Further, there is not a sufficient space for the wiring work in a machine into which the electric motor is already assembled. Thus, it is desirable to have a high degree of freedom in selecting a direction of the approach and connection of the electric cables to the electric motor in order to facilitate the wiring work.

It is also necessary to avoid exposure of connecting portions of the electric cables and the internal cables to exterior of the electric motor for securing a human safety, preventing a short circuit by contamination of the connecting portions, and preventing an external force on the connecting portion. Thus, a terminal case surrounding the connecting portion and having a through hole for introducing the electric cables has been adopted, or a through hole is formed on a body of the electric motor for introducing the electric cables.

In order to obtain high degree of freedom of direction of the approach and connection of the electric cables, there are proposals of (1) forming through holes for introducing the electric cables at different positions in a terminal case, (2) preparing a plurality of types of electric motors having a terminal case with a through hole at a different position to be selected in accordance with request of an user, (3) providing structure for easily forming a through hole, such as perforation, at one of different positions so that a through hole is formed at a desired position in connecting the electric cables to the electric motor, (4) providing a plurality of through holes at different positions on a body of an electric motor.

The above proposals have respective problems as flows; In the case of proposals (1) and (4), it is necessary to provide plugs for closing the holes which are not used for introducing the electric cables so as to prevent invading of liquid and dust from the open holes. There also arises a problem that shape of the terminal case or the body has to be complicated to raise manufacturing cost. In the case of proposal (2), it is cumbersome and uneconomical to prepare a plurality of types of electric motors and select one type of the electric motor for a manufacturer and also a user. In the case of proposal of (3), the through hole once formed remains open and it is costly to provide structure such as perforation for easily forming a through hole at different position.

SUMMARY OF THE INVENTION

An object of the present invention is to provide an electric motor having a sufficient degree of freedom in selecting a direction of approaching and connecting the electric cables to the internal cables without the above problems in the prior art.

An electric motor of the present invention comprises: a body containing internal cables; and a cable introducing member having a through hole for introducing the electric cables for connection with the internal cables. The cable introducing member is detachably mounted on the body to have one of a plurality of different orientations such that a position of the through hole relative to the body is selectable from a plurality of different positions.

With the above arrangement, a high degree of freedom is secured in selecting a direction of the approach and connection of the electric cables to the electric motor of the same kind using the same cable introducing member, without forming redundant through holes for obtaining the high degree of freedom. Thus, invading of water and dust into the motor from the unused through holes is prevented and it is not necessary to close the unused through holes. Further, the position of the through hole relative to the body of the electric motor can be changed by detaching the cable introducing member from the body and mounting the cable introducing member again on the body to have a different orientation.

The plurality of orientations of the cable introducing member may be angularly displaced by a predetermined angle.

The cable introducing member may have a cross section of a regular polygon, or an annular cross section.

The electric motor may further comprise a terminal rest fixed to the body for allowing connection of the electric cables with the internal cables in at least two different directions. The terminal rest may have a plurality of terminals including an upper terminal and a lower terminal positioned at different heights.

BRIEF DESCRIPTION OF THE DRAWINGS

FIGS. 4a and 4b are a side view and an elevation view, respectively, of the connecting portion in the electric motor as shown in FIG. 3;

FIGS. 8a and 8b are a side view and an elevation view, respectively, of the connecting portion in the electric motor as shown in FIG. 5;

FIGS. 12a and 12b are a side view and an elevation view, respectively, of the connecting portion in the electric motor as shown in FIG. 11.

DETAILED DESCRIPTION OF THE PREFERRED EMBODIMENTS

Figure 1:
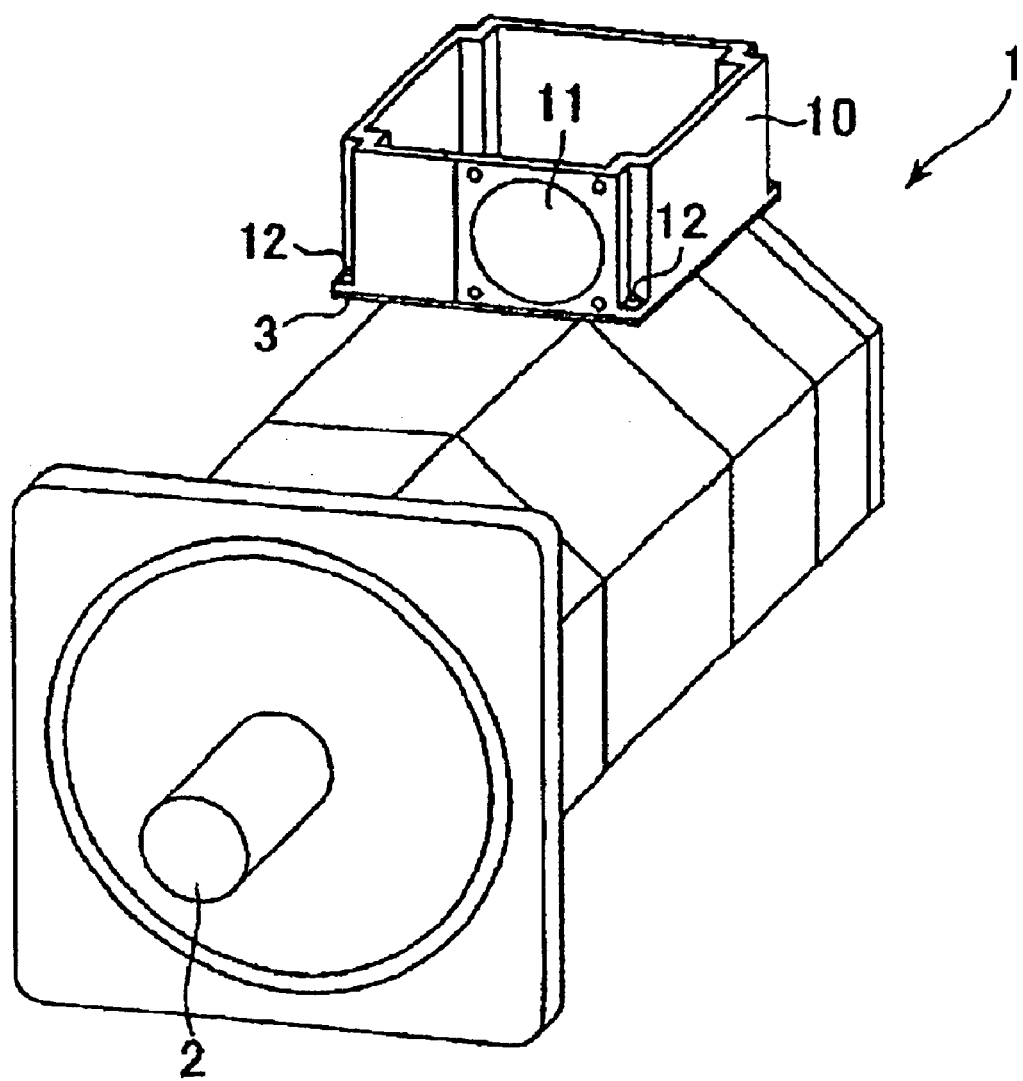
FIG. 1 is a perspective view of an electric motor with a cable introducing member having a through hole for introducing electric cables and mounted on the electric motor to have one orientation, according to a first embodiment of the present invention.

A first embodiment of the present invention will be described referring to FIGS. 1, 2a, 2b, 3, 4a and 4b. A base member 3 of a terminal case is fixed on a body 1 of an electric motor having an output shaft 2. A cable introducing member 10 is mounted on the body 1 by fixing four corners of the member 10 to the base member 3 by screws 12. The cable introducing member 10 is a hollow rectangular prism having a square cross-section and four side walls. A through hole 11 for inserting the electric cables is formed on one of the side walls of the cable introducing member 10.

Figure 2B:
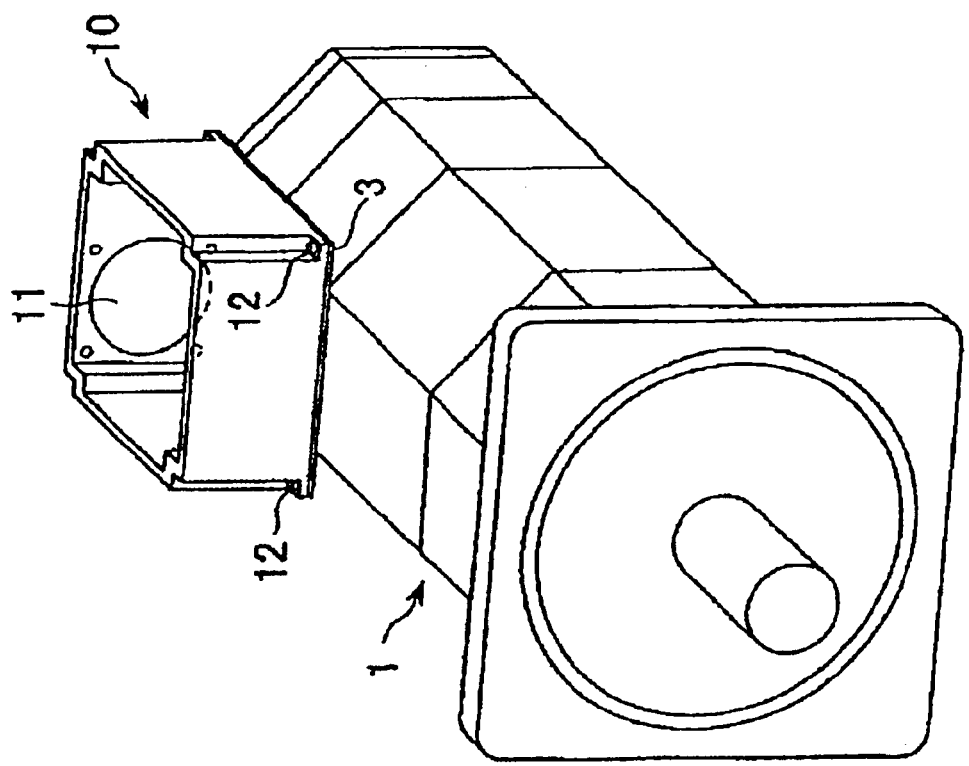
FIG. 2b is perspective view of the electric motor with the cable introducing member mounted thereon to have still another orientation.
Figure 2A:
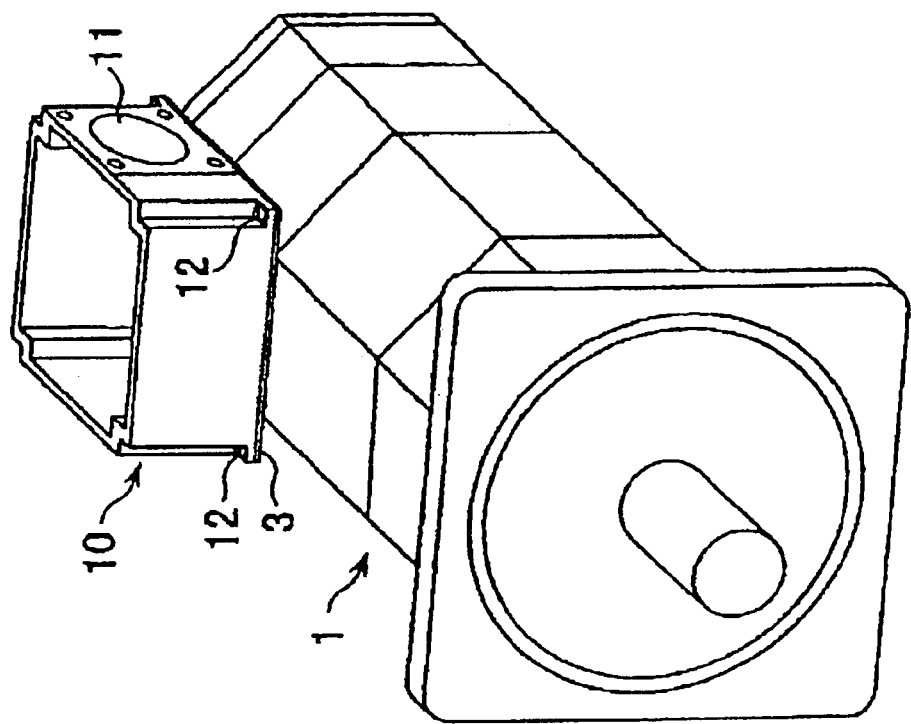
FIG. 2a is a perspective view of the electric motor with the cable introducing member mounted thereon to have another orientation.

The cable introducing member 10 is easily attached to and detached from the body 1 by turning the screw 12 at the four corners. In mounting the cable introducing member 10 on the body 1, the cable introducing member 10 can be take one of four different orientations angularly displaced by 90° since the cable introducing member 10 has the square cross-section. FIGS. 1, 2a and 2b show three mounting statuses of the cable introducing member 10 on the body 1. FIGS. 2a and 2b show orientations of the cable introducing member 10 angularly displacing the orientation of the cable introducing member 10 as shown in FIG. 1 by 90° and 180°, respectively.

One of the four orientations of the cable introducing member 10 is selected in accordance with approach direction of the electric cables (direction of introducing the electric cable into the terminal case). The orientation of the cable introducing member 10 is selected so that the through hole 11 formed one of the side walls is positioned in conformity of approach direction of the electric cables.

Figure 3:
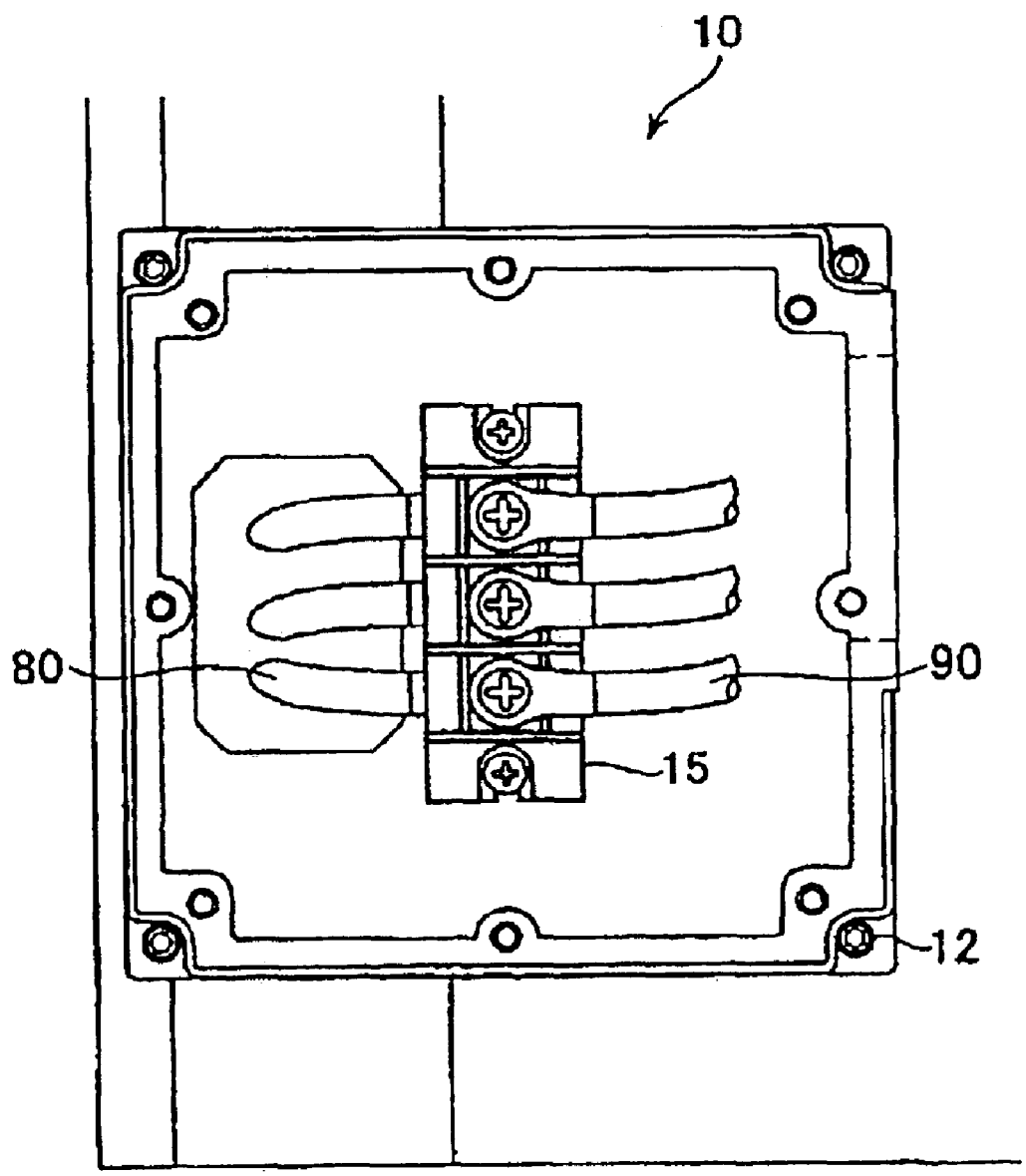
FIG. 3 is a plan view of a connecting portion of the electric cables and internal cables in the electric motor with the orientation of the cable introducing member as shown in FIG. 1.

The connection of the electric cables introduced from the insertion hole 11 with the internal cables is shown in FIGS. 3, 4a and 4b.

As shown in FIG. 3, a terminal rest 15 for the connection of the electric cables 90 with internal cables 80 is fixed to the base member 3 at an approximately central position of the base member 3. The terminal rest 15 includes terminals for internal cables 80 and electric cables 90 to be connected to the internal cables 80, and the internal cables 80 and the associated electric cables 90 are fixed to the terminals by screws to be connected with one another.

As clearly seen from FIGS. 4a and 4b, the terminal rest 15 has a plurality of pairs of terminals. Each pair comprises an upper terminal to which the electric cable 90 is connected, and a lower terminal to which the internal cable 80 is connected, which are electrically connected to each other.

As shown in FIG. 4a, the electric cables 90 may be connected to the upper terminal in a direction as indicated by a broken line 91 which is opposite to the direction of the electric cables 90 as indicated by the solid line. One of the connecting directions of the electric cable 90 may be selected in accordance with the orientation of the cable introducing member 10. In general, the connecting direction of the electric cables 90 is selected so that the electric cables 90 reach the upper terminals from the insertion hole 11 without being bent sharply. The orientation of the cable introducing member 10 as shown in FIG. 1 or FIG. 2b is suitable for the arrangement of the terminal rest 15 in this embodiment.

As shown in FIGS. 4a and 4b, a lid member 13 is provided for covering a top opening of the cable introducing member 10. The lid member 13 is mounted on the cable introducing member 10 by appropriate engaging means such as screws or hinges so as to close the top opening of the cable introducing member 10, and also expose the connection portions of the electric cables 90 and the internal cables 80 by releasing the engagement by the engaging means for the connection work of the electric cables 90 with the upper terminals and maintenance of cleaning and inspection of the connecting portions. In FIGS. 1, 2a and 2b and 3, the lid member 13 is omitted for convenience of depiction.

Figure 5:
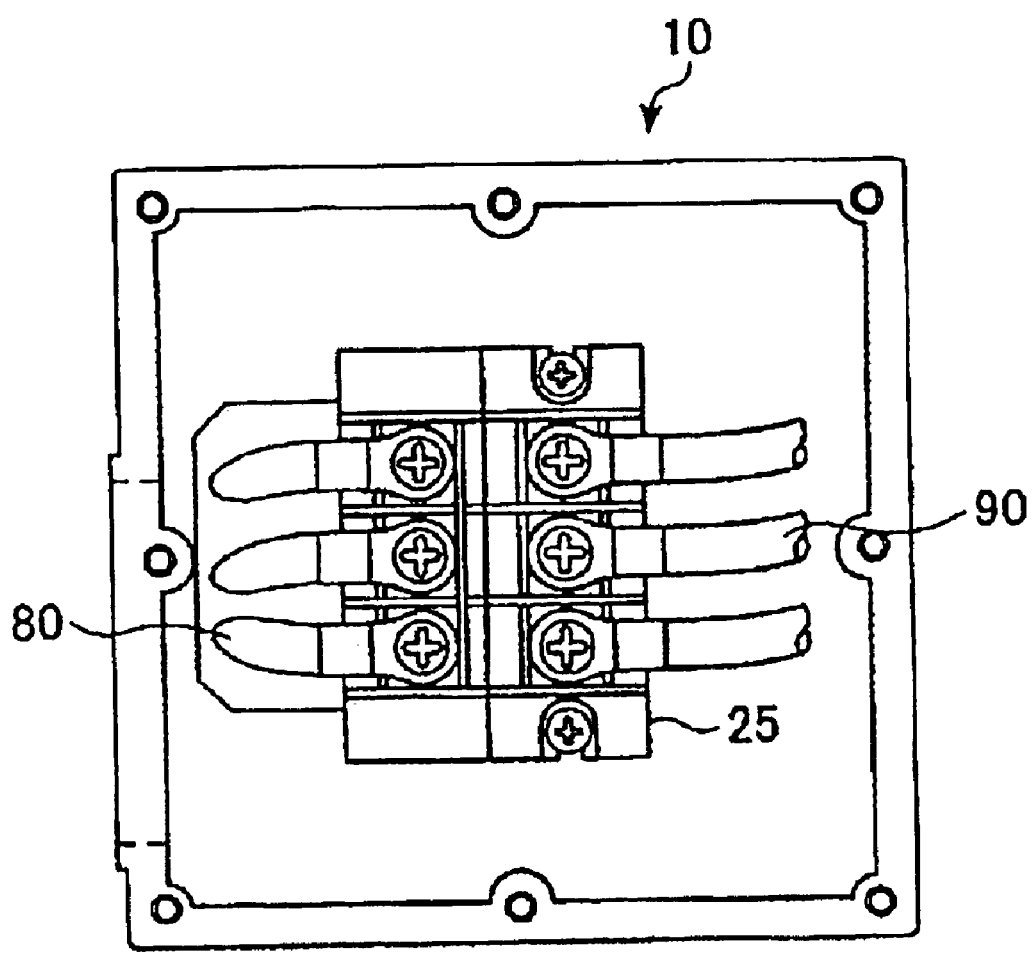
FIG. 5 is a plan view of a connecting portion of the electric cables and internal cables in an electric motor according to a second embodiment of the present invention.

A second embodiment of the present invention will be described referring to FIGS. 5, 6a and 6b. The second embodiment is a modification of the first embodiment and the structure and the mounting manner of the cable introducing member 10 are the same as those in the first embodiment. As described, the cable introducing member 10 is in the form of a hollow rectangular prism having a square cross-section and four side walls and corners. The cable introducing member 10 is mounted on the body 1 of the electric motor to take one of four different orientations angularly displaced by 90° such that the through hole 11 formed on one side wall is positioned in conformity with the approaching direction of the electric cables 90.

The second embodiment differs from the first embodiment in a structure of a terminal rest for the connection of the electric cables 90 and the internal cables 80. As the terminal rest 15 of the first embodiment, a terminal rest 25 of this embodiment is fixed at an approximately central position of the base member 3, as shown in FIG. 5. The terminal rest 25 includes terminals corresponding to the internal cables 80 and the associated electric cables 90, and the internal cables 80 and the associated electric cables 90 are fixed to the terminals by screws to be connected with one another.

Figure 6A:
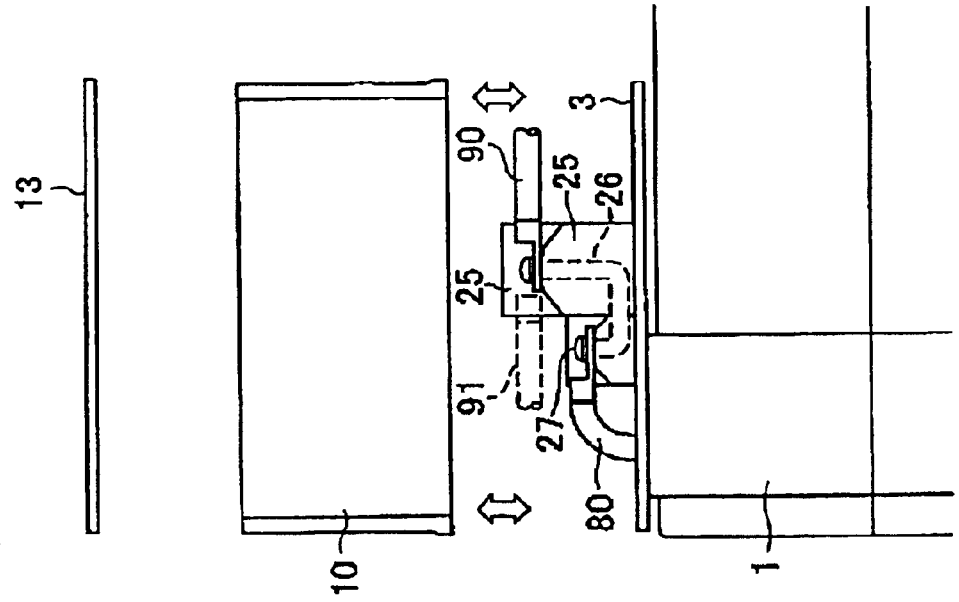
FIGS. 6a and 6b are an elevation view and a side view, respectively, of the connecting portion in the electric motor as shown in FIG. 5.
Figure 6B:
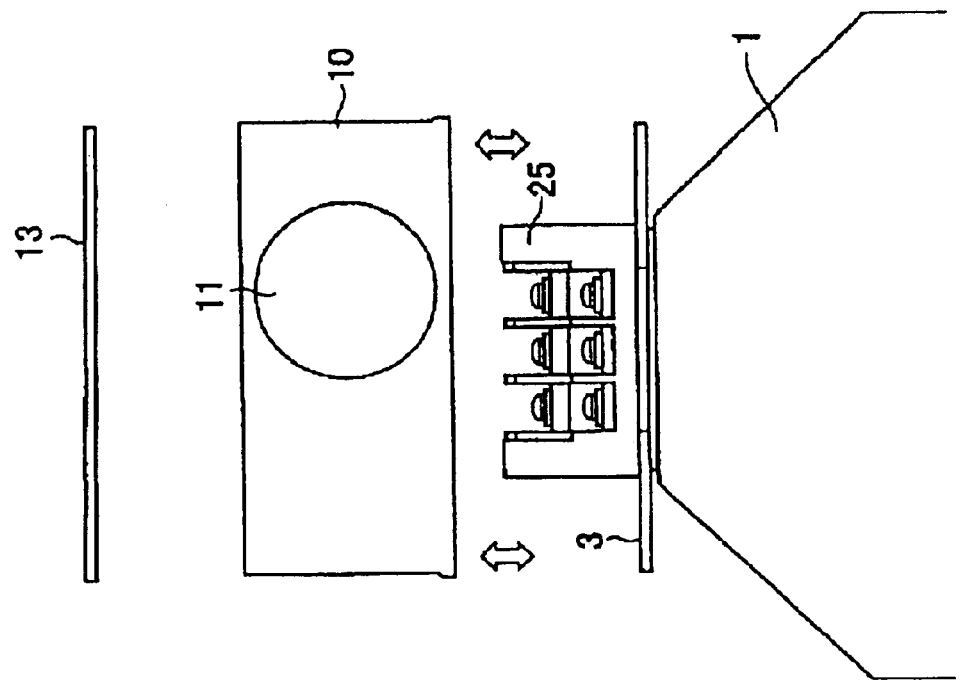

As clearly seen from FIGS. 6a and 6b, the terminal rest 25 has a plurality of pairs of terminals, each comprising an upper terminal to which the electric cable 90 is connected and a lower terminal to which the internal cable 80 is connected. A conducting piece 26 for electrically connecting the upper terminal and the associated lower terminal is formed into a U-shape so that connection work of the internal cable 80 to the lower terminal by turning screws 27 can be carried out from upward of the terminal rest 25. With this arrangement, the connection work of the internal cables 80 with the lower terminals are made easy.

The electric cables 90 may be connected to the upper terminal in a direction as indicated by a broken line 91 which is opposite to the direction of the electric cables 90 as indicated by the solid line, as in the first embodiment. One of the connecting directions of the electric cable 90 may be selected in accordance with the orientation of the cable introducing member 10. In general, the connecting direction of the electric cables 90 is selected so that the electric cables 90 reach the upper terminals from the insertion hole 11 without being bent sharply.

As shown in FIGS. 6a and 6b, a lid member 13 is provided for covering a top opening of the cable introducing member 10. The lid member 13 is mounted on the cable introducing member 10 by appropriate engaging means such as screws or hinges so as to close the top opening of the cable introducing member 10, and also expose the connection portions of the electric cables 90 and the internal cables 80 by releasing the engagement by the engaging means for the connection work of the electric cables 90 with the upper terminals and maintenance of cleaning and inspection of the connecting portions.

Figure 7:
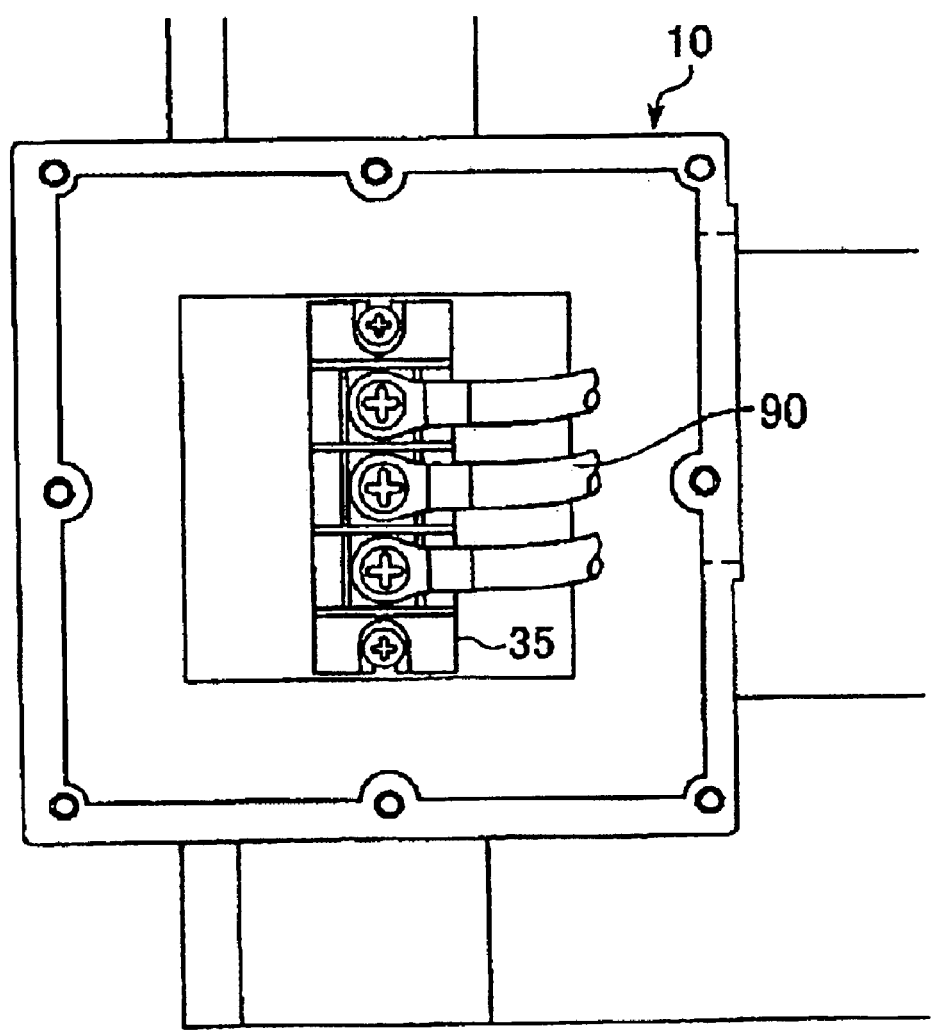
FIG. 7 is a plan view of a connecting portion of the electric cables and internal cables in an electric motor according to a second embodiment of the present invention.

A third embodiment of the present invention will be described referring to FIGS. 7, 8a and 8b. The second embodiment is another modification of the first embodiment and the structure and the mounting manner of the cable introducing member 10 are the same as those in the first embodiment. As described, the cable introducing member 10 is in the form of a hollow rectangular prism having a square cross-section and four side walls and corners. The cable introducing member 10 is mounted on the body 1 of the electric motor to take one of four different orientations angularly displaced by 90° such that the through hole 11 formed on one side wall is positioned in conformity with the approaching direction of the electric cables 90.

The third embodiment differs from the first and second embodiments in a structure of a terminal rest for the connection of the electric cables 90 and the internal cables 80. As in the first and second embodiments, a terminal rest 35 of this embodiment is fixed at an approximately central position of the base member 3, as shown in FIG. 5.

As clearly seen from FIG. 8a, the terminal cables 80 extend upwardly from lower side of the terminals rest 35 and are directly connected with respective terminals for connection with the electric cables 90. According to this embodiment, the connection between the terminals of the terminal rest 35 and the internal cables 80 are secured in advance and thus the connection work for connecting the internal cables 80 with the terminals are not necessary in an assemble of the electric motor.

The electric cables 90 may be connected to the terminal in a direction as indicated by a broken line 91 which is opposite to the direction of the electric cables 90 as indicated by the solid line, as in the first and second embodiments. One of the connecting directions of the electric cable 90 may be selected in accordance with the orientation of the cable introducing member 10. In general, the connecting direction of the electric cables 90 is selected so that the electric cables 90 reach the terminals from the insertion hole 11 without being bent sharply.

Figure 9:
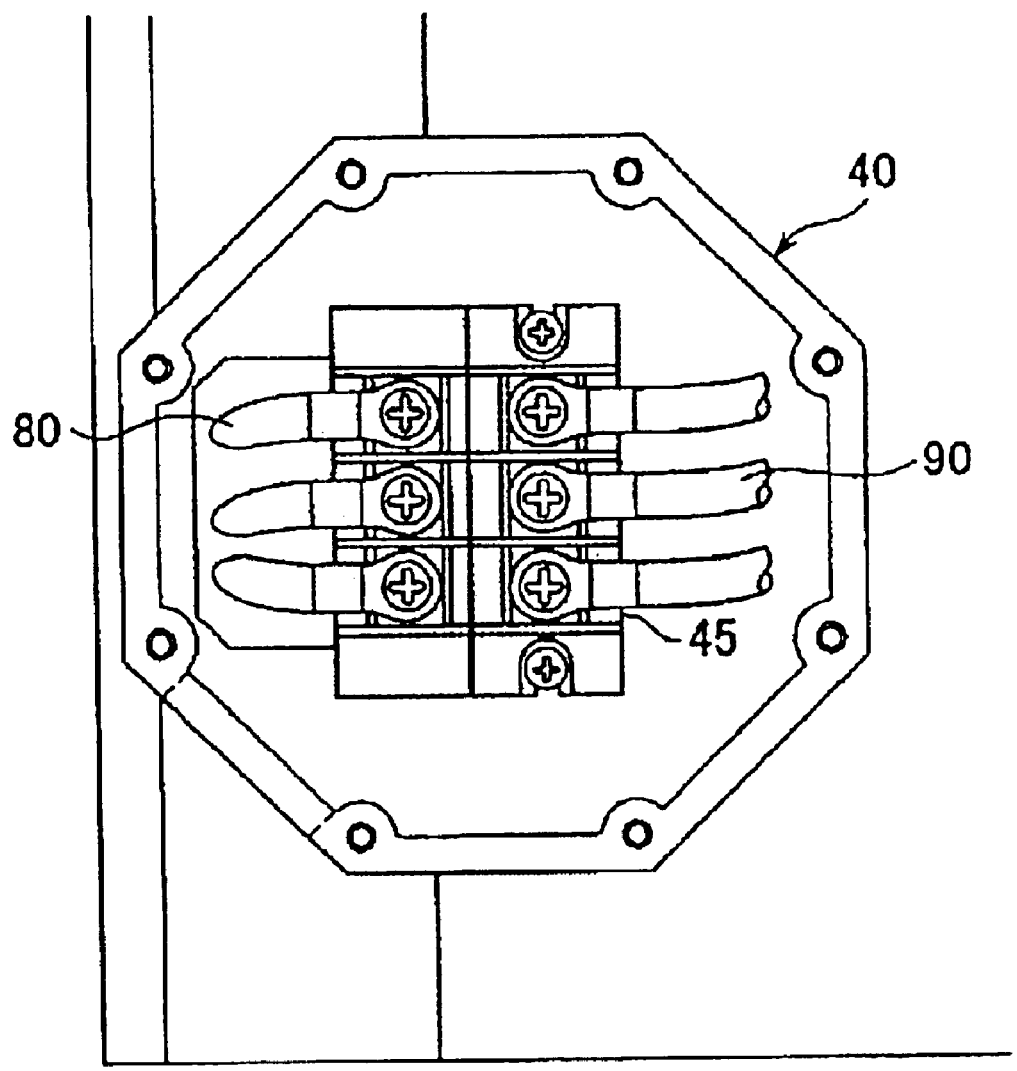
FIG. 9 is a plan view of a connecting portion of the electric cables and internal cables in an electric motor with another cable introducing member according to a fourth embodiment of the present invention.
Figure 10A:
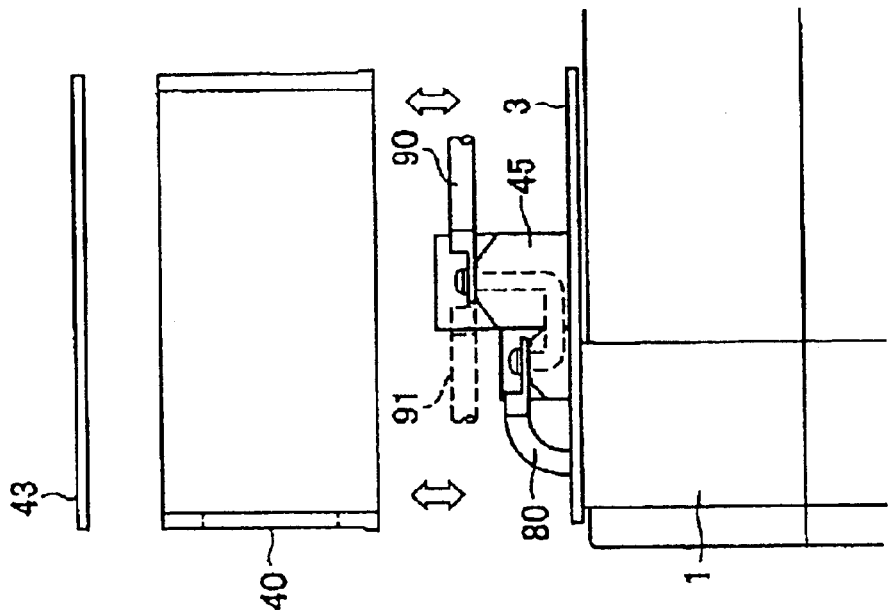
FIGS. 10a and 10b are an elevation view and a side view, respectively, of the connecting portion in the electric motor as shown in FIG. 9.

In the foregoing embodiments, the cable introducing member 10 having a square cross-section is adopted to realize "four" degree of freedom of orientation of the cable introducing member which are angularly displaced by 90°. The degree of freedom of orientation of the cable introducing member can be increased. A fourth embodiment of the present invention as shown in FIGS. 9, 10a and 10b is an example of the electric motor in which the degree of freedom is further increased.

This embodiment is featured by a cable introducing member 40 having a cross-section of a regular octagon in place of the cable introducing member 10 having a square cross-section. The cable introducing member 40 is mounted on the body 1 of the electric motor to take one of eight different orientations angularly displaced by 45° such that the through hole 11 formed on one side wall is positioned in conformity with the approaching direction of the electric cables 90, so that "eight" degree of freedom of orientation of the cable introducing member 40 is realized.

The same structure for connection of the electric cables 90 with the internal cables 80 as that in the second embodiment is adopted in this embodiment. As clearly seen from FIGS. 10a and 10b, a terminal rest 45 has a plurality of pairs of terminals, each comprising an upper terminal to which the electric cable 90 is connected and a lower terminal to which the internal cable 80 is connected. A conducting piece for electrically connecting the upper terminal and the associated lower terminal has a U-shape so that connection work of the internal cable 80 to the lower terminal by turning screws can be carried out from upward of the terminal rest 45.

Figure 10B:
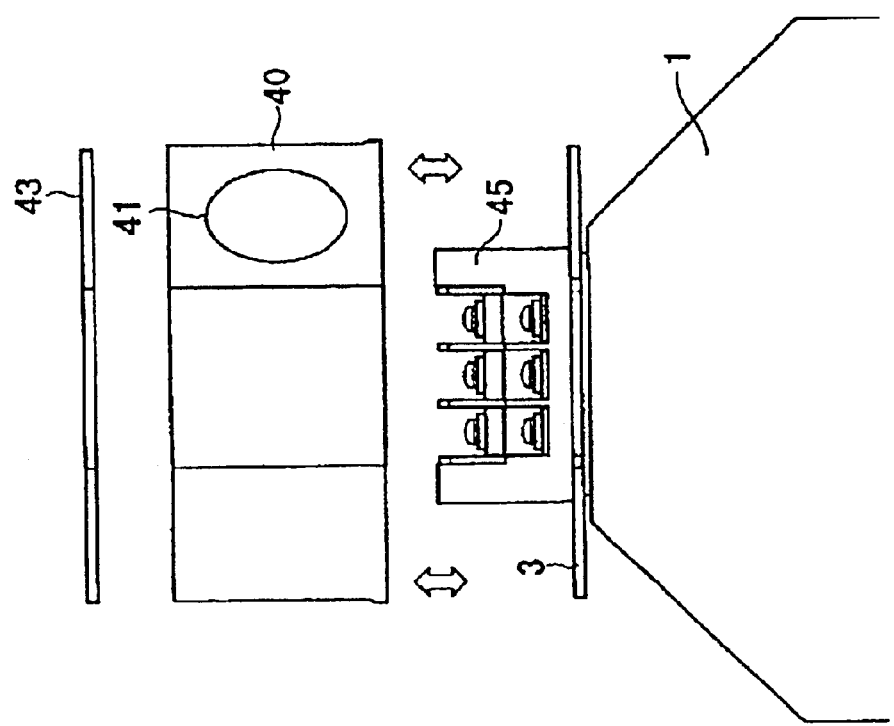
Figure 11:
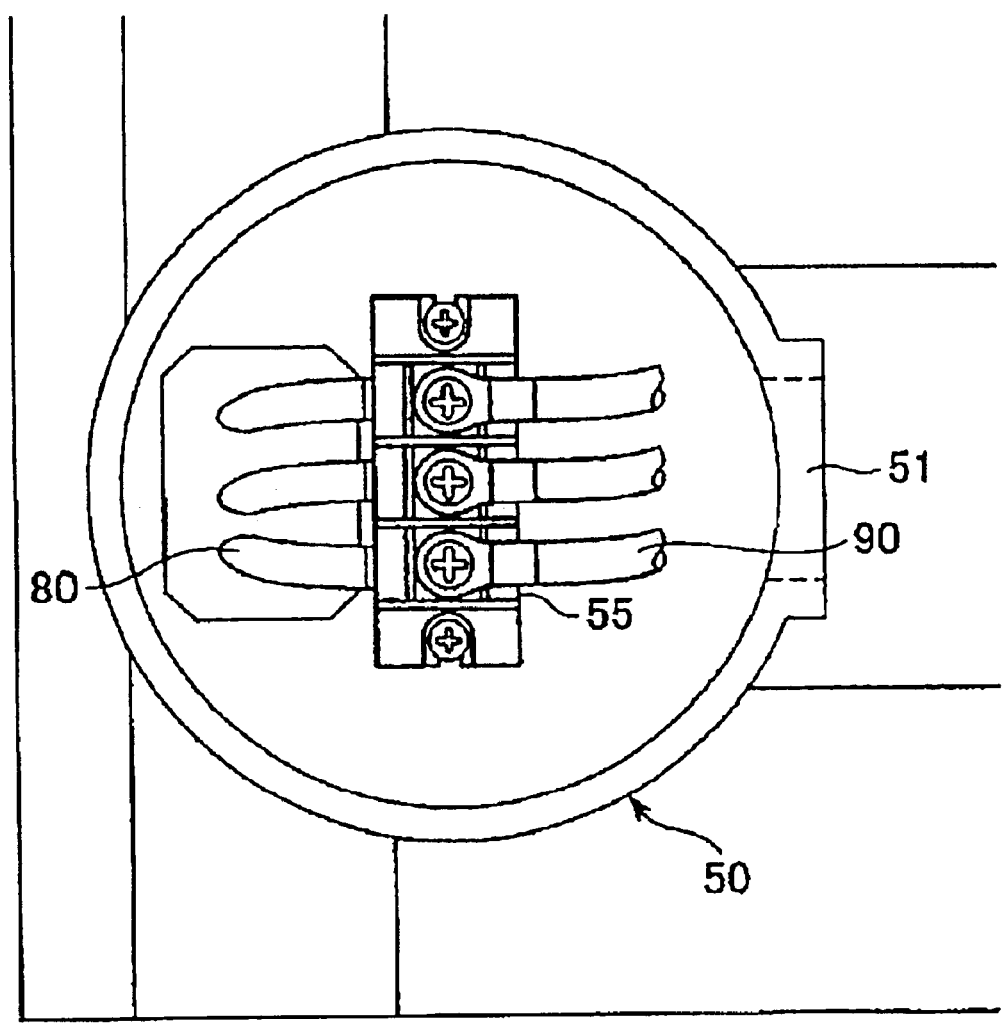
FIG. 11 is a plan view of a connecting portion of the electric cables and internal cables in an electric motor with still another cable introducing member according to a fifth embodiment of the present invention.

The electric cables 90 may be connected to the upper terminal in a direction as indicated by a broken line 91 which is opposite to the direction of the electric cables 90 as indicated by the solid line in FIG. 10b. One of the connecting directions of the electric cable 90 may be selected in accordance with the orientation of the cable introducing member 10. In general, the connecting direction of the electric cables 90 is selected so that the electric cables 90 reach the upper terminals from the insertion hole 11 without being bent sharply. A lid member 43 is formed into a regular octagon shape in conformity with the cross-section of the regular octagon of the cable introducing member 40.

A fifth embodiment of the present invention as shown in FIGS. 11–13c is an example of an electric motor in which the degree of freedom of orientation of the cable introducing member is further increased. This embodiment is featured by a cable introducing member 50 in a form of a hollow cylinder having an annular cross-section. A through hole 51 for introducing the electric cables 90 is formed on an annular wall of the hollow cylinder. The cable introducing member 50 is mounted on the base member 3 in a manner different from that of the cable introducing members 10 and 40, as follows;

An annular guide 31 having an outer circumference conformable to an inner circumference of the cable introducing member 50 is formed on the base member 3. The inner circumference of the cable introducing member 50 is fitted into the outer circumferences of the guides 31 to mount the cable introducing member 50 of the base member 3. The guide 31 may comprise a ring formed continuously or arc segments formed periodically which has an outer diameter slightly smaller than the inner diameter of the cylindrical cable introducing member 50.

Figure 13C:
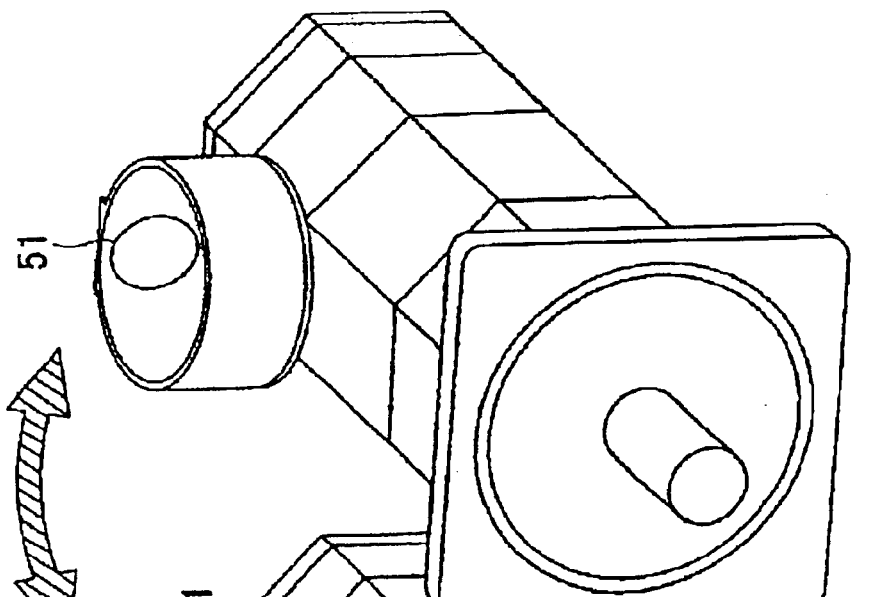
FIGS. 13a–13c are perspective views of the electric motor with the cable introducing member as shown in FIG. 11 mounted thereon to have three different orientations.
Figure 13B:
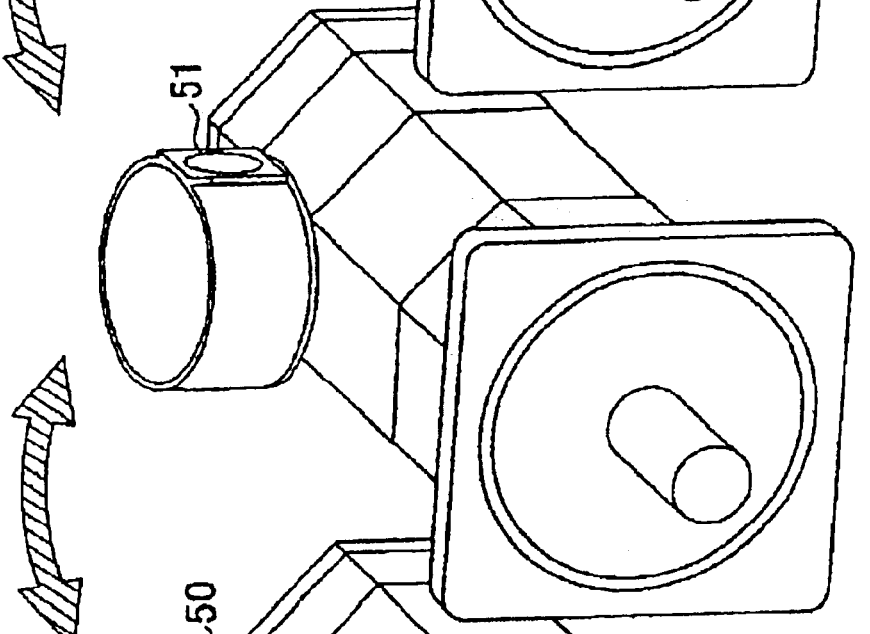
Figure 13A:
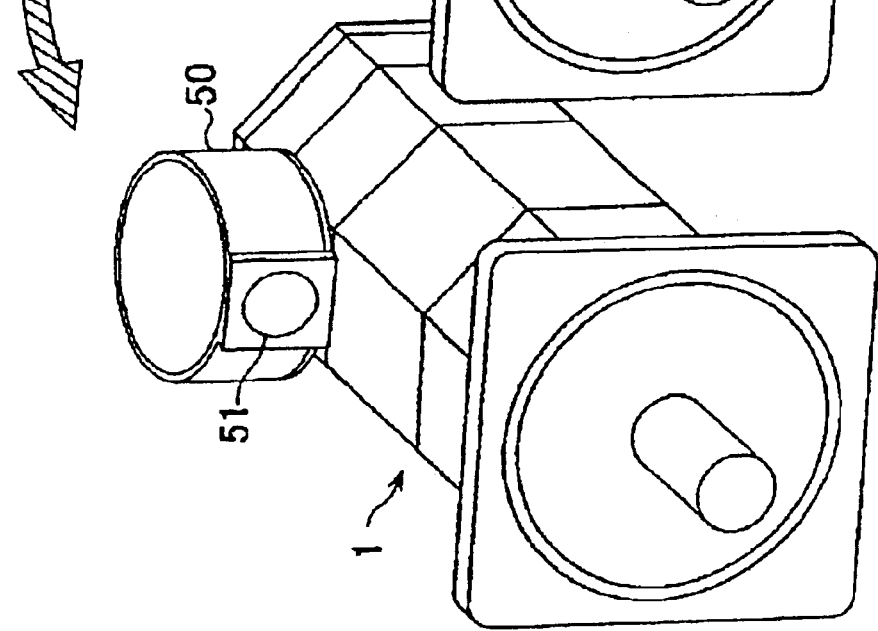

With the above structure, the orientation of the cable introducing member 50 is arbitrarily selected by sliding the cylindrical cable introducing member 50 along the annular guide 31. Thus, degree of freedom of the orientation of the cable introducing member 50 is infinite in this embodiment. A part or the whole of the base member 3, e.g. only the annular guide 31, and the cable introducing member 50 may be formed by magnetic material (for example, the annular guide 31 is formed by permanent magnet and the cable introducing member 50 is formed by ferruginous material) in order to fix the selected angular position of the cable introducing member 50. FIGS. 13a–13c show three different orientations of the cable introducing member 50 mounted on the electric motor.

The same structure for connection of the electric cables 90 with the internal cables 80 as that in the first embodiment is adopted in this embodiment. As seen from FIGS. 12a and 12*b*, a terminal rest 55 has a plurality of pairs of terminals, each comprising an upper terminal to which the electric cable 90 is connected, and a lower terminal to which the internal cable 80 is connected. A conducting piece for electrically connecting the upper terminal and the associated lower terminal is provided in the terminal rest 55.

The electric cables 90 may be connected to the upper terminal in a direction as indicated by a broken line 91 which is opposite to the direction of the electric cables 90 as indicated by the solid line in FIG. 12*a*. One of the connecting directions of the electric cable 90 may be selected in accordance with the orientation of the cable introducing member 10. In general, the connecting direction of the electric cables 90 is selected so that the electric cables 90 reach the upper terminals from the insertion hole 11 without being bent sharply. A lid member 53 is formed into a circular shape in conformity with the annular cross-section of the cable introducing member 50.

According to the present invention, a position of a through hole for introducing electric cable to be connected with internal cables, relative to a body of an electric motor is selectable from a plurality of different positions by a cable introducing member detachably mounted on the body to have one of a plurality of different orientations. Therefore, a high degree of freedom is secured in selecting a direction of the approach and connection of the electric cables to the electric motor of the same kind using the same cable introducing member. Further, it is not necessary to form redundant through holes for obtaining the high degree of freedom in selecting the approaching and connecting the electric cables. Thus, invading of water and dust into the motor from the unused through holes is prevented and it is not necessary to close the unused through holes.

What is claimed is:

1. An electric motor to be connected to electric cables, comprising:

a body containing internal cables;

a cable introducing member having a through hole to introduce the electric cables to connect with the internal cables, said cable introducing member being detachably mounted on said body to have one of a plurality of different orientations such that a position of the through hole relative to said body is selectable from a plurality of different positions; and a terminal rest fixed to said body to allow connection of the electric cables with the internal cables in at least two different directions.

2. The electric motor as recited in claim 1, wherein the plurality of orientations of said cable introducing member are angularly displaced by a predetermined angle.

3. The electric motor as recited in claim 1, wherein said cable introducing member has a cross section of a regular polygon.

4. The electric motor as recited in claim 1, wherein said cable introducing member has an annular cross section.

5. The electric motor as recited in claim 1, wherein said terminal rest has a plurality of terminals comprising an upper terminal and a lower terminal positioned at different heights.

* * * * *

UNITED STATES PATENT AND TRADEMARK OFFICE
CERTIFICATE OF CORRECTION

PATENT NO. : 6,828,704 B2
DATED : December 7, 2004
INVENTOR(S) : Takashi Okamoto et al.

It is certified that error appears in the above-identified patent and that said Letters Patent is hereby corrected as shown below:

Column 1,
Line 5, change "flows" to -- follows --;

Column 6,
Line 39, change ";" to -- . --

Signed and Sealed this

Third Day of May, 2005

JON W. DUDAS
*Director of the United States Patent and Trademark Office*